(12) United States Patent
Zhuang et al.

(10) Patent No.: US 7,864,270 B2
(45) Date of Patent: Jan. 4, 2011

(54) ELECTRONIC DEVICE AND LC SHUTTER WITH DIFFUSIVE REFLECTIVE POLARIZER

(75) Inventors: Jim Zhuang, Kildeer, IL (US); Tomohiro Ishikawa, Evanston, IL (US); Robert Polak, Lindenhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 116 days.

(21) Appl. No.: 12/028,092

(22) Filed: Feb. 8, 2008

(65) Prior Publication Data

US 2009/0201447 A1 Aug. 13, 2009

(51) Int. Cl.
 *G02F 1/1335* (2006.01)
(52) U.S. Cl. .............. 349/97; 349/64; 349/96; 349/112
(58) Field of Classification Search ............ None
 See application file for complete search history.

(56) References Cited

U.S. PATENT DOCUMENTS

| | | | |
|---|---|---|---|
| 3,915,548 A | 10/1975 | Opittek et al. | |
| 4,500,173 A | 2/1985 | Leibowitz et al. | |
| 4,728,936 A | 3/1988 | Guscott et al. | |
| 5,121,234 A | 6/1992 | Kucera | |
| 5,225,818 A | 7/1993 | Lee et al. | |
| 5,231,381 A | 7/1993 | Duwaer | |
| 5,376,948 A | 12/1994 | Roberts | |
| 5,796,454 A | 8/1998 | Ma | |
| 5,818,615 A | 10/1998 | Abileah et al. | |
| 5,881,377 A * | 3/1999 | Giel et al. ............ | 455/343.1 |
| 6,047,196 A | 4/2000 | Makela et al. | |
| 6,058,164 A | 5/2000 | Ibuka et al. | |
| 6,184,955 B1 | 2/2001 | Okumura | |
| 6,243,080 B1 | 6/2001 | Molne | |
| 6,271,835 B1 | 8/2001 | Hoeksma | |
| 6,310,609 B1 | 10/2001 | Morgenthaler | |

(Continued)

FOREIGN PATENT DOCUMENTS

GB 2348039 A 9/2000

(Continued)

OTHER PUBLICATIONS

Liquid Crystal Display; from Wikipedia; http://en.wikipedia.org/wiki/Liquid_crystal_display; Aug. 9, 1007; pp. 1-9.

(Continued)

*Primary Examiner*—Omar Rojas
(74) *Attorney, Agent, or Firm*—Vedder Price P.C.

(57) ABSTRACT

An electronic device (200) includes a display (202) and an LC shutter (204), at least a portion of which is operatively positioned over the display (202). The LC shutter (204) provides switching between a transparent state and a diffusive state with high image integrity, and high transmission in the transparent state. In one embodiment, the electronic device (200) further includes control logic (206) operatively coupled to the LC shutter (204) to provide control signals (212) to the LC shutter (204) to effect the transparent state. The LC shutter (204) includes a first dichroic polarizer (300), such as a broadband dichroic polarizer, an LC cell (304), and a diffusive reflective polarizer (307). The LC cell (304) is interposed between the first dichroic polarizer (300) and the diffusive reflective polarizer (307). Related methods are also set forth.

15 Claims, 9 Drawing Sheets

U.S. PATENT DOCUMENTS

| | | | |
|---|---|---|---|
| 6,327,376 B1 | 12/2001 | Harkin | |
| 6,385,139 B1 | 5/2002 | Yasuo et al. | |
| 6,470,196 B1 | 10/2002 | Yamashita | |
| 6,574,044 B1 | 6/2003 | Sahouani et al. | |
| 6,574,487 B1 | 6/2003 | Smith et al. | |
| 6,590,705 B1 | 7/2003 | Allen et al. | |
| 6,646,697 B1 | 11/2003 | Sekiguchi et al. | |
| 6,662,244 B1 | 12/2003 | Takahasi | |
| 6,674,504 B1* | 1/2004 | Li et al. | 349/169 |
| 6,704,004 B1 | 3/2004 | Osterg.ang.rd et al. | |
| 6,760,157 B1 | 7/2004 | Allen et al. | |
| 6,768,481 B2 | 7/2004 | Ozawa et al. | |
| 6,768,586 B2 | 7/2004 | Sahouani et al. | |
| 6,813,957 B1 | 11/2004 | Platz | |
| 6,819,316 B2 | 11/2004 | Schulz et al. | |
| 6,819,380 B2 | 11/2004 | Wen et al. | |
| 6,842,170 B1 | 1/2005 | Akins et al. | |
| 6,968,744 B1 | 11/2005 | Silverbrook et al. | |
| 7,106,517 B2 | 9/2006 | Olczak | |
| 7,123,945 B2 | 10/2006 | Kokubo | |
| 7,139,114 B2 | 11/2006 | Schmitz et al. | |
| 7,180,672 B2 | 2/2007 | Olczak | |
| 2001/0036013 A1 | 11/2001 | Allen et al. | |
| 2001/0043297 A1 | 11/2001 | Makoto | |
| 2003/0025679 A1 | 2/2003 | Taylor et al. | |
| 2003/0054867 A1 | 3/2003 | Dowlat et al. | |
| 2003/0058223 A1 | 3/2003 | Tracy et al. | |
| 2004/0036821 A1 | 2/2004 | Paukshto et al. | |
| 2004/0058718 A1 | 3/2004 | Yu | |
| 2004/0100598 A1 | 5/2004 | Masaya et al. | |
| 2004/0104826 A1 | 6/2004 | Philipp | |
| 2004/0218121 A1 | 11/2004 | Zhuang et al. | |
| 2004/0246580 A1 | 12/2004 | Sahouani et al. | |
| 2004/0265602 A1 | 12/2004 | Kobayashi et al. | |
| 2005/0007339 A1 | 1/2005 | Sato | |
| 2005/0018106 A1 | 1/2005 | Wang et al. | |
| 2005/0020325 A1 | 1/2005 | Enger et al. | |
| 2005/0030048 A1 | 2/2005 | Bolender et al. | |
| 2005/0064913 A1 | 3/2005 | Kim | |
| 2005/0088417 A1 | 4/2005 | Mulligan | |
| 2005/0093767 A1 | 5/2005 | Lu et al. | |
| 2005/0114825 A1 | 5/2005 | Leung et al. | |
| 2005/0134549 A1 | 6/2005 | Kamiya et al. | |
| 2005/0243069 A1 | 11/2005 | Yorio et al. | |
| 2005/0266891 A1 | 12/2005 | Mullen | |
| 2006/0026535 A1 | 2/2006 | Hotelling et al. | |
| 2006/0038937 A1 | 2/2006 | Kaneko et al. | |
| 2006/0046792 A1 | 3/2006 | Hassemer et al. | |
| 2006/0146012 A1 | 7/2006 | Arneson et al. | |
| 2006/0161871 A1 | 7/2006 | Hotelling et al. | |
| 2006/0166702 A1 | 7/2006 | Dietz et al. | |
| 2006/0181662 A1* | 8/2006 | Kameyama et al. | 349/117 |
| 2006/0197753 A1 | 9/2006 | Hotelling | |
| 2006/0266640 A1 | 11/2006 | Halsey et al. | |
| 2006/0290871 A1 | 12/2006 | Harada | |
| 2007/0030438 A1 | 2/2007 | Chien | |
| 2007/0052689 A1 | 3/2007 | Tak | |
| 2007/0075965 A1 | 4/2007 | Huppi et al. | |
| 2008/0013174 A1 | 1/2008 | Allen et al. | |
| 2008/0169944 A1 | 7/2008 | Howarth et al. | |
| 2008/0204417 A1 | 8/2008 | Pierce et al. | |
| 2008/0204418 A1 | 8/2008 | Cybart et al. | |
| 2008/0204428 A1 | 8/2008 | Pierce et al. | |
| 2008/0204463 A1 | 8/2008 | Cybart et al. | |
| 2008/0207254 A1 | 8/2008 | Pierce et al. | |
| 2008/0211734 A1 | 9/2008 | Huitema et al. | |
| 2008/0266244 A1 | 10/2008 | Bai et al. | |
| 2008/0266500 A1* | 10/2008 | Nimura | 349/117 |
| 2008/0291169 A1 | 11/2008 | Brenner et al. | |
| 2008/0309589 A1 | 12/2008 | Morales | |
| 2008/0316397 A1 | 12/2008 | Polak et al. | |
| 2009/0042619 A1 | 2/2009 | Pierce et al. | |
| 2009/0046072 A1 | 2/2009 | Emig et al. | |
| 2009/0161059 A1 | 6/2009 | Emig et al. | |
| 2009/0201446 A1 | 8/2009 | Zhuang et al. | |
| 2009/0225057 A1 | 9/2009 | Polak et al. | |
| 2009/0231283 A1 | 9/2009 | Polak et al. | |

FOREIGN PATENT DOCUMENTS

| | | | |
|---|---|---|---|
| JP | 6029275 A | 2/1994 | |
| JP | 8063271 A | 3/1996 | |
| JP | 2000098386 A | 4/2000 | |
| JP | 2002049461 A | 2/2002 | |
| JP | 2003101622 A | 4/2003 | |
| JP | 2005099470 A | 4/2005 | |
| JP | 2005100186 A | 4/2005 | |
| JP | 2006091486 A | 4/2006 | |
| JP | 2006243658 A | 9/2006 | |
| JP | 2006284757 A | 10/2006 | |
| KR | 20000007200 A | 2/2000 | |
| KR | 20020025646 A | 4/2002 | |
| KR | 20040019677 A | 3/2004 | |
| KR | 100652767 B1 | 11/2006 | |
| KR | 20060134659 A | 12/2006 | |
| KR | 20070109603 A | 11/2007 | |
| WO | 9732223 | 9/1997 | |
| WO | 0129148 | 4/2001 | |
| WO | WO 02/31807 | 4/2002 | |
| WO | 2007081318 | 7/2007 | |

OTHER PUBLICATIONS

Samsung T509 Phone (T-Mobile); from www.mobiledia.com/phones/samsung/sgh-t509.html; Aug. 9, 2007; pp. 1-10.

Prism Films; from http://cms.3m.com/cms/US/en/2-136/cRFFkFN/view; May 1, 2007; p. 1.

Apple-iTunes for your Mobile Phone; from www.apple.com/itunes/mobile; Aug. 9, 2007; pp. 1-2.

Pioneer unveils Inno XM2go portable XM radio/MP3 player; from www.engadget.com; Jan. 4, 2006; pp. 1-23.

International Search Report from Korean Patent Office; for International Application No. PCT/US2009/032940; dated Sep. 1, 2009.

International Search Report from EP Patent Office; for International Application No. PCT/US2009/032929; dated May 8, 2009.

Cell Phone Details; Palm Treo 650 (Cingular) Cell Phone; from www.letstalk.com; Sep. 26, 2009.

\* cited by examiner

ELECTRONIC DEVICE AND LC SHUTTER WITH DIFFUSIVE REFLECTIVE POLARIZER

RELATED APPLICATIONS

This application is related to co-pending application entitled "ELECTRONIC DEVICE AND LC SHUTTER FOR POLARIZATION-SENSITIVE SWITCHING BETWEEN TRANSPARENT AND DIFFUSIVE STATES", filed on even date, Ser. No. 12/028,084, inventors James et al., owned by instant Assignee and is incorporated herein by reference.

FIELD OF THE INVENTION

The present invention generally relates to electronic devices that employ liquid crystal shutters.

BACKGROUND OF THE INVENTION

Image morphing capability is increasingly becoming an important design consideration in electronic devices. In the optical and imaging arts, "morphing" refers to the changing of one image to another. For example, electronic devices frequently employ "morphing user interfaces," i.e., interfaces that change in appearance as a device's use changes. Such an interface is simpler and more intuitive to use since only the context-relevant functions are shown at any given time, with the interface elements that are not related to the current context being inactive and hidden. A simple example of a morphing user interface is a screen through which display content is visible in one state, such as an "on" state, and not visible in another state, such as an "off" state. In the "off" state, a user may see, for example, a reflection of the ambient light incident on the screen.

Several known morphing techniques can achieve a change from a transparent state to a specular reflective (i.e., mirror-like) state, such as a change from the content typically seen on a cellular telephone display or touch-sensitive keypad area to a mirror-like image. U.S. Pat. No. 6,574,044 ("the '044 patent") describes a combination of a reflective polarizer and a colored dichroic polarizer to achieve colored looks with a liquid crystal ("LC") display. This construction can achieve specular reflective colors, but not diffusive colors. One embodiment of the '044 patent also employs a diffusive adhesive to achieve diffusive colors, but this embodiment cannot achieve switching between a transparent state and a diffusive state because as long as the diffusive adhesive is present, all incoming light is diffused under all circumstances.

U.S. Pat. No. 6,184,955 describes an LC device including a specular reflective polarizer and a light scattering layer. Because the light scattering layer is not polarization-sensitive, however, this construction does not enable switching between a transparent state and a diffusive state.

U.S. Patent Publication 2004/0036821 describes an LC shutter including at least two LC cells and at least three polarizers. The LC shutter may include scattering layers and reflective layers. However, this construction only describes the use of scattering layers to suppress interference effects in the LC shutter. The scattering layers are not polarization-sensitive and thus do not enable switching between a transparent and a diffusive state. This construction is also cumbersome because it uses two LC cells in the LC shutter.

Other known morphing constructions use a specular or diffusive reflective polarizer between the LC shutter and a light source, such as a display, for "recycling" purposes. The LC shutter typically passes light polarized along one direction and absorbs light polarized along a different direction. Such absorption of "wrongly-polarized" light is wasteful. Accordingly, the specular or diffusive reflective polarizer reflects wrongly-polarized light emanating from the light source and prevents it from being absorbed by the LC shutter. Another reflector placed on the opposite side of the light source reflects the light back, with a different polarization or polarizations, and provides another opportunity for the light to be transmitted. Thus, if a diffusive reflective polarizer is used in such a construction, it only provides "recycling" capability and does not enable the LC shutter to switch between a transparent state and a diffusive state.

Other constructions do provide for switching between a transparent state and a diffusive state, but are not polarization-sensitive LC shutters and therefore produce lower image integrity, along with lower transmission in the transparent state. For example, U.S. Pat. Nos. 6,760,157 and 6,590,705 describe optical films that provide diffuse reflection. However, the film is not included within a construction having other polarization-sensitive elements to optimize image integrity and the degree of transmission in the transparent state. For example, the diffuse reflection may be obtained by applying a voltage directly to the film itself to control the degree to which it is transparent to or scattering to incoming light.

Accordingly, it is desirable to provide electronic devices having the ability to switch between a transparent state and a diffusive state in a size- and cost-efficient manner, and that are polarization-sensitive and provide high image integrity and high transmission in a transparent state. Other desirable features and characteristics of the present invention will become apparent from the subsequent detailed description and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
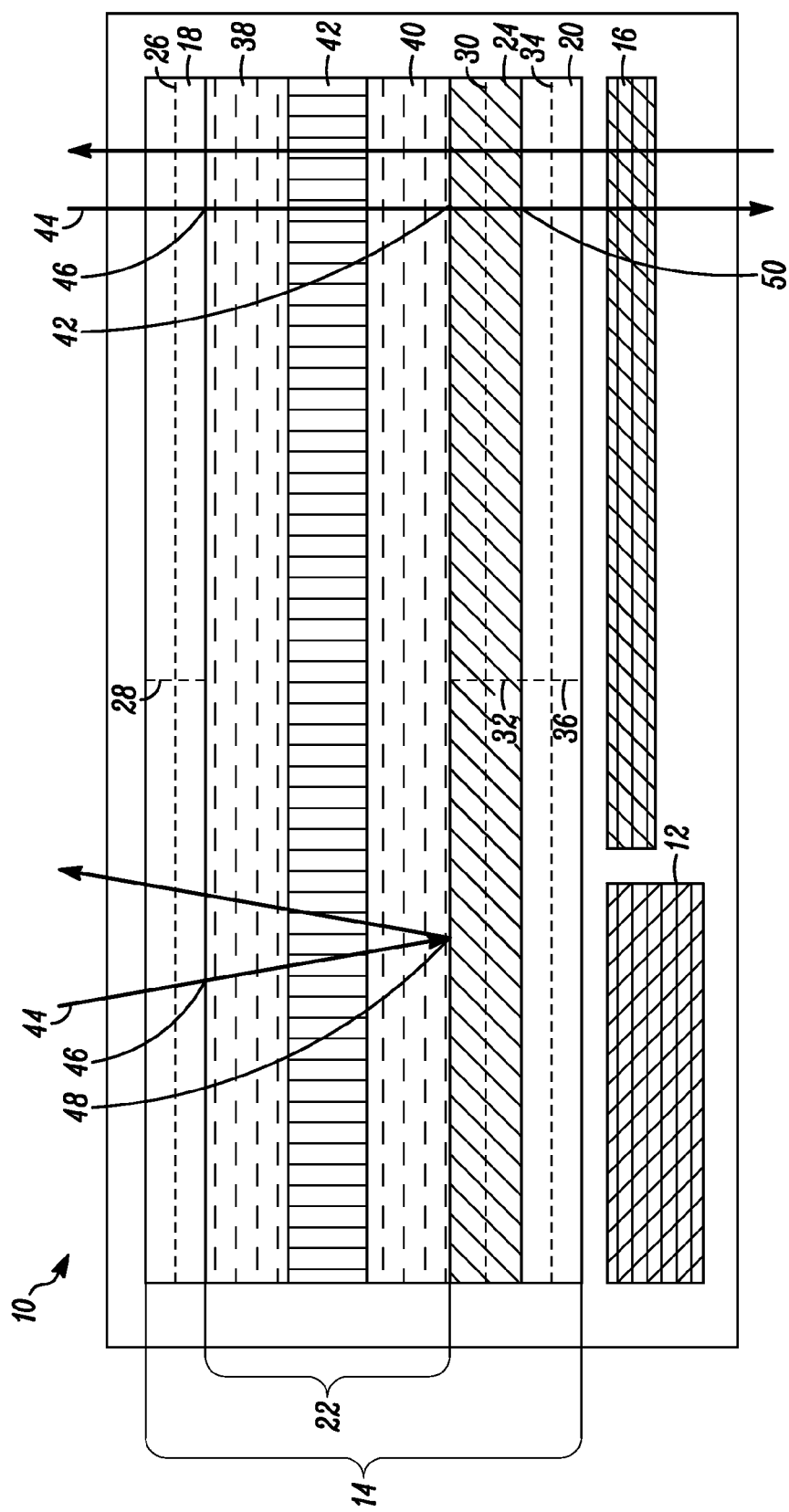
FIG. 1 illustrates an example of a prior art electronic device having a display and an LC shutter capable of switching between a transparent state and a specular state.

Briefly, an electronic device includes a display and an LC shutter. At least a portion of the LC shutter is operatively positioned over the display. In one example, the LC shutter provides switching between a diffusive state and a transparent state with high image integrity, and with high transmission in the transparent state. The diffusive state can be controlled to be a diffusive white state or a diffusive colored state, such as through the selective placement of a narrowband dichroic polarizer or narrowband reflective polarizer within the LC shutter to introduce color. In one embodiment, the electronic device further includes control logic operatively coupled to the LC shutter and operative to provide control signals to the LC shutter to effect the transparent state. When the control logic does not provide control signals to the LC shutter, the LC shutter operates in the diffusive state. The LC shutter (204) includes a first dichroic polarizer (300), such as a broadband dichroic polarizer, an LC cell (304), and a diffusive reflective polarizer (307). The LC cell (304) is interposed between the first dichroic polarizer (300) and the diffusive reflective polarizer (307).

In another example, the LC shutter includes a first dichroic polarizer, such as a broadband dichroic polarizer, a specular reflective polarizer, such as a broadband specular reflective polarizer, an LC cell, and an in-plane anisotropic diffuser, such as an in-plane anisotropic diffuser film. An in-plane anisotropic diffuser hereinafter means a diffuser in which at least 50 percent of light polarized in one direction is selectively diffusively transmitted (the remainder of such light being selectively diffusively reflected), while essentially all of the light polarized in the other direction is specularly transmitted. By way of example, the in-plane anisotropic diffuser may selectively diffusively transmit 60 percent of the light polarized in one direction, or any suitable percentage of such light. The LC cell is interposed between the first dichroic polarizer and the specular reflective polarizer. The in-plane anisotropic diffuser is interposed between the LC cell and the specular reflective polarizer.

In another embodiment, the LC shutter further includes a second dichroic polarizer that is a narrowband dichroic polarizer. In one embodiment, the second dichroic polarizer is interposed between the in-plane anisotropic diffuser and the specular reflective polarizer. In another embodiment, the second dichroic polarizer is interposed between the LC cell and the in-plane anisotropic diffuser.

In another embodiment, the LC shutter still further includes an additional dichroic polarizer, such as a broadband dichroic polarizer. The LC cell, the in-plane anisotropic diffuser, the specular reflective polarizer, and, if present, the second dichroic polarizer, are interposed between the first dichroic polarizer and the additional dichroic polarizer.

In an alternate embodiment, a diffusive reflective polarizer can be used in place of a combination of in-plane anisotropic diffuser and broadband specular reflective polarizer. Thus, the LC cell is placed between the first dichroic polarizer and the diffusive reflective polarizer. A diffusive reflective polarizer hereinafter means a polarizer in which essentially all of the light polarized in one direction is selectively diffusively reflected while essentially all of the light polarized in the other direction is selectively specularly transmitted. In another embodiment, a second dichroic polarizer that is a narrowband dichroic polarizer is interposed between the LC cell and the diffusive reflective polarizer.

Among other advantages, an LC shutter and a device including an LC shutter provide appealing visual effects such as switching between a transparent state and a diffusive state to change, for example, the color or visual appearance of, in one example, an exterior surface of a handheld device or other suitable device. As such, the LC shutter can switch between bright diffusive colors or bright diffusive white and a highly transparent state. As such, as applied to a device, the device can appear to be morphing from one color to a transparent state to provide different looks thereby enhancing user appeal.

FIG. 1 illustrates an example of a prior art electronic device 10 having a display 12 and an LC shutter 14 capable of switching between a transparent state, as illustrated by the light depicted on the right portion of FIG. 1, and a specular state, as illustrated by the light depicted on the left portion of FIG. 1. The electronic device may further include an electroluminescent or reflecting element 16, such as a keypad portion. The LC shutter 14 includes a first dichroic polarizer 18, a second dichroic polarizer 20, an LC cell 22, and a specular reflective polarizer 24.

The first dichroic polarizer 18 includes a first axis 26 and a second axis 28. The second dichroic polarizer 20 includes a first axis 30 and a second axis 32. The specular reflective polarizer 24 includes a first axis 34 and a second axis 36. The LC cell 22 includes a first substrate 38, a second substrate 40, and liquid crystal material 42. The LC cell 22 is interposed between the first dichroic polarizer 18 and the specular reflective polarizer 24. The LC cell 22 and specular reflective polarizer 24 are interposed between the first dichroic polarizer 18 and the second dichroic polarizer 20.

In operation, ambient light 44 is incident upon the first dichroic polarizer 18 when it reaches the LC shutter 14. The first dichroic polarizer 18 is generally a broadband dichroic polarizer. As is known in the art, a broadband polarizer is responsive to a continuous, wide range of electromagnetic frequencies, typically including all frequencies or colors within the range of visible light. As is further known in the art, a dichroic polarizer is substantially transparent to light polarized along a first axis of the dichroic polarizer, also known as a transmission axis or a transmissive axis, and substantially absorbs light polarized along a second axis of the dichroic polarizer that is different from the first axis. Accordingly, the first dichroic polarizer 18 transmits first polarized light 46 to the LC cell 22 that is substantially polarized along the first axis 26 of the first dichroic polarizer 18 and that is the same color as the ambient light 44.

As is known in the art, a voltage may be applied to the LC cell 22. If a voltage is applied to the LC cell 22, the liquid crystal material 42, and hence the LC cell 22, will pass the first polarized light 46 without rotating its polarization, thereby producing post-LC light 48. However, if a voltage is not applied to the LC cell 22, the liquid crystal material 42, and hence the LC cell 22, will pass the first polarized light 46 with a rotation, or "twist," of its polarization to produce the post-LC light 48.

Accordingly, when a voltage is applied to the LC cell 22, post-LC light 48 that exits the LC cell 22 is substantially polarized in the same direction as the first axis 26 of the first dichroic polarizer 18. On the other hand, when no voltage is applied to the LC cell 22, the post-LC light 48 is substantially polarized in a different direction because of the polarization rotation effect of the LC cell 22.

The ambient light 44 is then transmitted to the specular reflective polarizer 24. The specular reflective polarizer 24 is typically a broadband specular reflective polarizer. As is known in the art, a broadband reflective polarizer, like a broadband dichroic polarizer, is responsive to a continuous, wide range of electromagnetic frequencies typically including all frequencies or colors within the range of visible light and is substantially transparent to light polarized along a first axis. However, unlike a broadband dichroic polarizer, a broadband reflective polarizer substantially reflects, instead of absorbs, light polarized along a second axis that is different from its first axis. Moreover, a broadband specular reflective polarizer substantially specularly reflects this light. That is, the reflection of this light produces a metallic or mirror-like appearance, as opposed to a situation in which light is dispersed upon reflection, also known as a diffusive reflection, such as the case of a shadow produced by the reflection of a person's face from a piece of white paper.

Accordingly, in the event that any components of post-LC light 48 are, at the time they enter the specular reflective polarizer 24, polarized along the first axis 30 of the specular reflective polarizer 24, the specular reflective polarizer 24 transmits post-specular reflective polarizer light 50 to the second dichroic polarizer 20 that is substantially polarized along the first axis 30 of the specular reflective polarizer 24, and that is the same color as the post-LC light 48.

In the event that any components of post-LC light 48 are, at the time they enter the specular reflective polarizer 24, polarized along the second axis 32 of the specular reflective polarizer 24, the specular reflective polarizer 24 specularly reflects those components.

The second dichroic polarizer 20 is generally a broadband dichroic polarizer. The second dichroic polarizer 20 is used to enhance the polarization effect of the LC shutter 14 during operation in the transparent state in view of the non-ideal responses of the above components of the LC shutter 14.

As will be recognized by one of ordinary skill in the art, when a voltage is applied to the LC cell 22, light coming from the display 12 and, if the electroluminescent or reflecting element 16 is present, light coming from the electroluminescent or reflecting element 16, may be transmitted through the LC shutter 14 in the opposite order of transmission as that described above because each of the components of the LC shutter 14 has the same response to light incident from either direction. As further recognized by one of ordinary skill in the art, the extent to which ambient light 44 may be transmitted through the LC shutter 14, and thus the extent to which light coming from the display 12 and light coming from the electroluminescent or reflecting element 16 may be transmitted through the LC shutter 14, will depend both upon the orientation of the first axes 26, 30, and 34 and second axes 28, 32, and 36 of each of the first dichroic polarizer 18, second dichroic polarizer 20, and specular reflective polarizer 24, respectively, and upon whether a voltage is applied to the LC cell 22 and if not, what angle of polarization rotation is introduced by the LC cell 22.

For example, in a situation where the first axes 26, 30, and 34 and second axes 28, 32, and 36 are all aligned with respect to one another, where the first axes 26, 30, and 34 are perpendicular to the second axes 28, 32, and 36, and where the LC cell 22 rotates the polarization of light by 90° in the absence of applied voltage, the prior art system of FIG. 1 switches between a transparent state and a specular state by way of switching between the presence or absence of applied voltage to the LC cell 22. In the presence of an applied voltage to the LC cell 22, any components of ambient light 44 which are polarized along the second axes 28, 32, and 36 of the polarizers 18, 20, and 24 of the LC shutter 14 are substantially transmitted through the LC shutter 14, as described above.

If no voltage is applied to the LC cell 22, any components of ambient light 44 which are polarized along the second axis 28 of the first dichroic polarizer 18 are substantially absorbed, but any components of ambient light 44 which are polarized along the first axis 26 of the first dichroic polarizer 18 are substantially transmitted through the first dichroic polarizer 18 to produce an output of first polarized light 46. The first polarized light 46 then has its polarization rotated 90° by the LC cell 22 and outputted from the LC cell 22 as post-LC light 48. After transmission through the LC cell 22, the post-LC light 48 is substantially polarized along the second axis 36 of the specular reflective polarizer 24. Accordingly, the post-LC light 48 is substantially specularly reflected by the specular reflective polarizer 24, and not transmitted to the display 12.

Similarly, any components of light coming from the display 12 which are polarized along the first axis 26 of the second dichroic polarizer 20 are substantially transmitted therethrough, while any components of light coming from the display 12 which are polarized along the second axis 28 of the second dichroic polarizer 20 are substantially absorbed. Because the components polarized along the first axis 26 of the second dichroic polarizer 20 have their polarization rotated 90° when they reach the LC cell 22, they are then substantially absorbed by the first dichroic polarizer 18, and thus substantially no light from the display 12 is transmitted through the LC shutter 14.

Accordingly, the prior art system can achieve switching between a transparent state and a specular reflective state, but is unable to achieve switching between a transparent state and a diffusive state.

Figure 2:
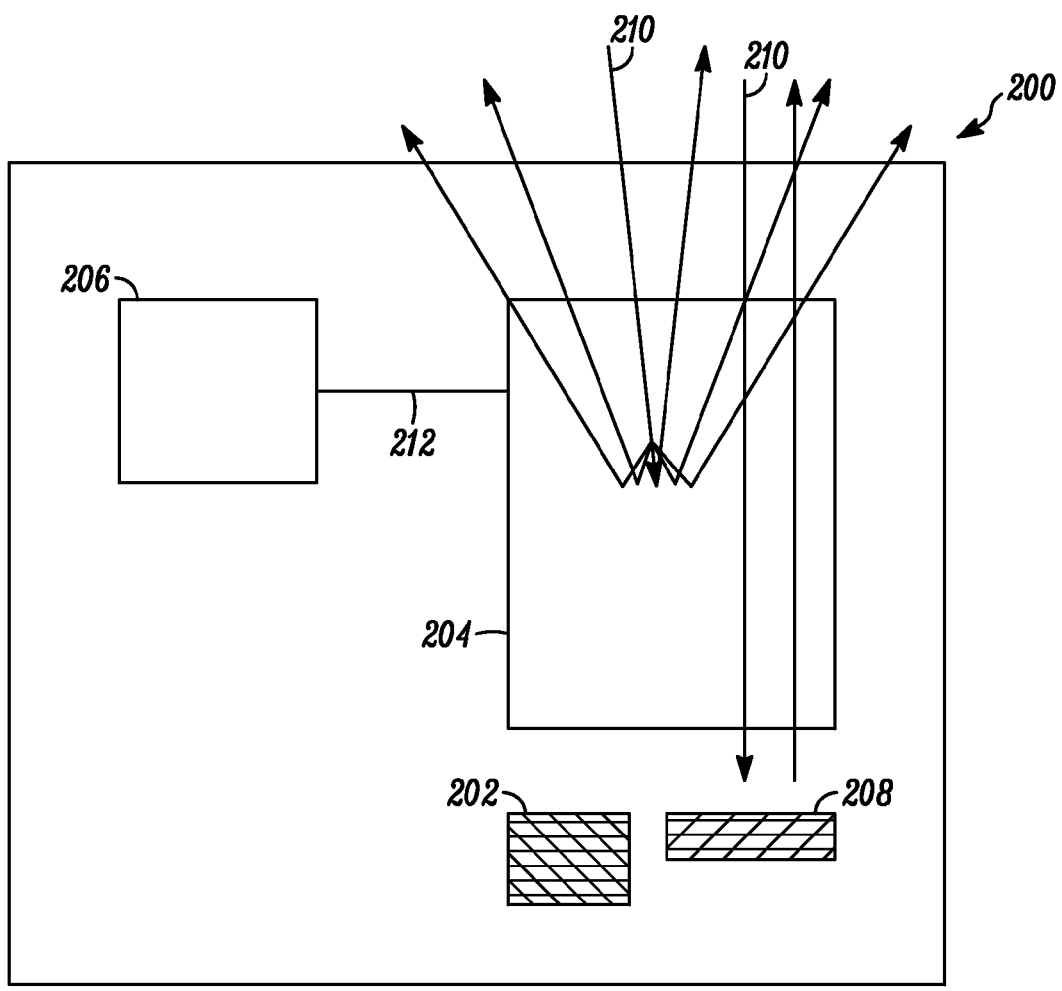
FIG. 2 is a block diagram of an electronic device illustrating a display, an LC shutter, control logic, and an electroluminescent or reflecting element in accordance with one embodiment.

FIG. 2 is a block diagram of an electronic device 200, illustrating a display 202, an LC shutter 204, and control logic 206 in accordance with one embodiment of the present invention. The electronic device 200 may further include an electroluminescent or reflecting element 208. The electronic device 200 may be, for example, a cellular telephone, personal digital assistant ("PDA"), laptop computer, desktop computer, television, printer, or any suitable handheld, portable, or fixed electronic device. The display 202 may be, for example, a cathode ray tube display, liquid crystal display ("LCD"), thin film transistor liquid crystal display, or any suitable device for displaying content to a user. The control logic 206 may be, for example, a digital signal processor, microcontroller, central processing unit, baseband processor, co-processor, or any suitable processing device. In addition, it may be discrete logic, or any suitable combination of hardware, software or firmware or any suitable structure. The electroluminescent or reflecting element 208 may be, for example, a keypad portion of the electronic device 200 that is operative to emit light or reflect light. For convenience, the electroluminescent or reflecting element 208 will be referred to hereinafter as a keypad portion, it being understood that the electroluminescent or reflecting element may be any suitable light source or reflecting source as described above.

At least a portion of the LC shutter 204 is operatively positioned over the display 202. In a preferred embodiment, if the keypad portion 208 is included, at least a portion of the LC shutter 204 is further operatively positioned over the keypad portion 208. The control logic 206 is operatively coupled to the LC shutter 204 and operative to cause the LC shutter 204 to switch between a transparent state, as illustrated by the light depicted on the right portion of the figure, and a diffusive state, as illustrated by the light depicted on the left portion of the figure. For purposes of this disclosure, a transparent state is to be interpreted as a state in which the LC shutter 204 is substantially transparent with respect to incoming light, taking into account polarization imperfections of the LC shutter 204 as known in the art. Similarly, a diffusive state is to be interpreted as a state in which the LC shutter 204 is substantially diffusive with respect to incoming light, taking into account the polarization imperfections of the LC shutter 204.

When the LC shutter 204 is in the transparent state, ambient light 210 is substantially transmitted through the LC shutter 204. The ambient light 210 may be, for example, natural light, artificial light, or any suitable light in the environment of the LC shutter 204. Additionally, light from the display 202 and, if the keypad portion 208 is present, light from the keypad portion 208, is substantially transmitted through the LC shutter 204. When the LC shutter 204 is in the diffusive state, ambient light 210 is diffusely reflected by the LC shutter 204 and in some embodiments is also colored by the LC shutter 204, as described in detail below. Additionally, any light from the display 202 and the keypad portion 208 is substantially not transmitted through the LC shutter 204.

In a preferred embodiment, and as described in further detail below with respect to FIG. 3, the control logic 206 is operative to provide control signals 212, in the form of applied voltages, to the LC shutter 204 to effect the transparent state. When the control logic 206 does not provide any control signals 212 to the LC shutter 204, the LC shutter 204 operates in the diffusive state.

Figure 3:
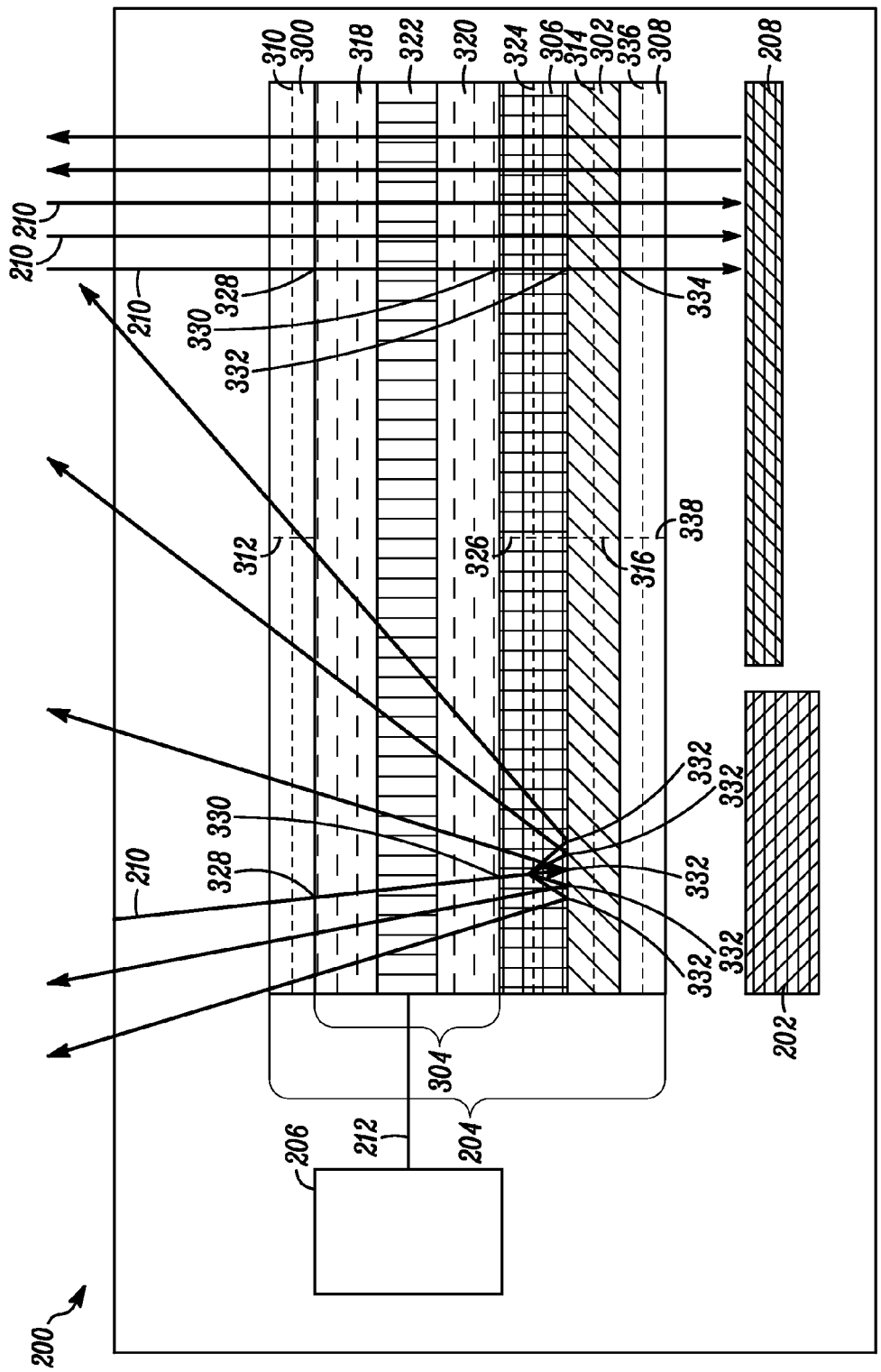
FIG. 3 illustrates the electronic device of FIG. 2 with a detailed view of the LC shutter, in accordance with one embodiment.

Referring now to FIG. 3, the electronic device 200 of FIG. 2 is shown with a detailed view of the LC shutter 204. As discussed above, the electronic device 200 may further include a keypad portion 208 and is shown as such in FIG. 3. In one embodiment, the electronic device 200 still further includes one or more various subsystems, such as a radiotelephone subsystem operatively coupled to the display 202, a video playback subsystem, an audio playback subsystem, or any suitable subsystem.

The LC shutter 204 includes a first dichroic polarizer 300, a specular reflective polarizer 302, an LC cell 304, and a in-plane anisotropic diffuser 306. In further embodiments, and as described in detail below, the LC shutter 204 includes one or both of a second dichroic polarizer (not shown in FIG. 3) and an additional dichroic polarizer 308, as discussed in detail below.

The first dichroic polarizer 300 includes a first (i.e., transmissive) axis 310 and a second (i.e., absorptive) axis 312. The first dichroic polarizer 300 may be made from, for example, an iodine complex, dichroic dyes, or any other suitable material. As discussed above, a dichroic polarizer is substantially transparent to light polarized along a first axis and substantially absorbs light polarized along a second axis that is different from the first axis. For purposes of this disclosure, an axis refers to any line in space of any orientation and is not limited to a line which defines, for example, a coordinate axis. In one embodiment, the first dichroic polarizer 300 is a broadband dichroic polarizer, such as that manufactured by Nitto Denko Corporation or Sumitomo Chemical Co., Ltd.

The specular reflective polarizer 302 includes a first (i.e., transmissive) axis 314 and a second (i.e., reflective) axis 316. The specular reflective polarizer 302 may be made from, for example, a polymer multi-layer material or any suitable material. For example, the specular reflective polarizer 302 may be the DBEF (Dual Brightness Enhancement Film) manufactured by 3M. In several embodiments, the specular reflective polarizer 302 is a broadband specular reflective polarizer.

The LC cell 304 is interposed between the first dichroic polarizer 300 and the specular reflective polarizer 302 and includes, for example, a first substrate 318 such as a top substrate, a second substrate 320 such as a bottom substrate, and liquid crystal material 322 interposed between the first substrate 318 and the second substrate 320. The first substrate 318 and second substrate 320 may be made from, for example, glass, polycarbonate, or cyclic polyolephine or any suitable polymer that is substantially transparent and of low birefringence. In the case of an applied voltage to the LC cell 304, such as through control signals 212, the liquid crystal material 322 passes incident light without rotating its polarization. However, when a voltage is not applied to the LC cell 304, the liquid crystal material 322 is operative to rotate the polarization of incident light while passing that incident light.

The in-plane anisotropic diffuser 306 is interposed between the LC cell 304 and the specular reflective polarizer 302. The in-plane anisotropic diffuser 306 includes a first axis 324 and a second axis 326. The in-plane anisotropic diffuser 306 may be, for example, an in-plane anisotropic diffuser film or any other suitable type of in-plane anisotropic diffuser.

Figure 4:
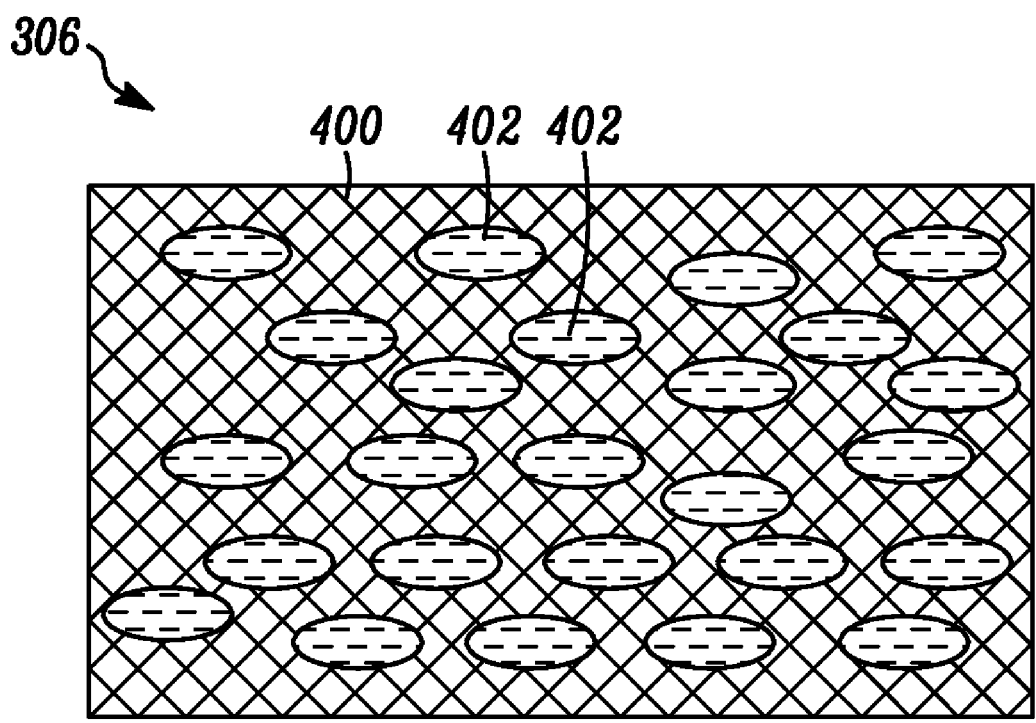
FIG. 4 illustrates the in-plane anisotropic diffuser of the LC shutter of FIG. 3, in accordance with an exemplary embodiment.

FIG. 4 illustrates an exemplary embodiment of the in-plane anisotropic diffuser 306 as a stretched PDLC (Polymer-Dispersed Liquid Crystal) film. The in-plane anisotropic diffuser 306 may also be made from any of several other constructions, such as a PNLC (Polymer Network Liquid Crystal) film on a rubbed polyimide surface or any other suitable construction.

In a preferred embodiment, the in-plane anisotropic diffuser 306 includes a matrix 400 and at least one domain 402 dispersed within the matrix 400. The in-plane anisotropic diffuser 306 is such that there is a refractive index match between the matrix 400 and the at least one domain 402 along a first axis 324 of the in-plane anisotropic diffuser 306, and a refractive index mismatch between the matrix 400 and the at least one domain 402 along a second axis 326 of the in-plane anisotropic diffuser 306 which is different from the first axis 324. In a preferred embodiment, the first axis and the second axis are substantially in the plane of the in-plane anisotropic diffuser 306. Further in a preferred embodiment and as illustrated in FIG. 4, the first axis 324 and the second axis 326 are perpendicular to one another, but as recognized by one having ordinary skill in the art, the first axis 324 and second axis 326 may be at any suitable orientations.

The matrix 400 includes a polymer, such as Polymethylemethacrylate, and the at least one domain 402 includes a liquid crystal material. Preferably, the refractive index mismatch between the matrix 400 and the at least one domain 402 along the second axis 326 is greater than 0.05. For example, in a stretched PDLC film, the stretch aligns the at least one domain 402 so as to achieve the refractive index mismatch. In a PNLC film, the rubbed polyimide aligns the at least one domain 402 so as to achieve the refractive index mismatch.

Referring back to FIG. 3, the first dichroic polarizer 300 outputs first polarized light 328, the LC cell 304 outputs post-LC light 330, the in-plane anisotropic diffuser outputs post-in-plane anisotropic diffuser light 332, and the specular reflective polarizer outputs post-specular reflective polarizer light 334. The first dichroic polarizer 300, specular reflective polarizer 302, and LC cell 304 operate in the same manner as that described above with respect to FIG. 1.

The in-plane anisotropic diffuser 306 is transparent to incoming light polarized along the first axis 324, and scattering to, i.e., introduces a diffusive appearance to, incoming light polarized along the second axis 326. For purposes of this disclosure, "transparent to" and "scattering to" are to be interpreted as being substantially transparent to and substantially scattering to incoming light, respectively, taking into account imperfections of the in-plane anisotropic diffuser 306.

The majority of the components of post-LC light 330 which reach the in-plane anisotropic diffuser 306 and which are polarized along the second axis 326, in addition to being scattered, are transmitted. Namely, the in-plane anisotropic diffuser 306 scatters and reflect approximately 50% or less of the ambient light 210 that is incident upon it and polarized along the second axis. The remainder of the post-LC light 330 that is polarized along the second axis 326 is scattered and transmitted.

In a preferred embodiment, the first axes 310, 314, and 324 and second axes 312, 316, and 326 of each of the first dichroic polarizer 300, specular reflective polarizer 302, and in-plane anisotropic diffuser 306, respectively, are oriented as follows: the first axes 310, 314, and 324 are all aligned with one another, the second axes 312, 316, and 326 are all aligned with one another, and each of the first axes 310, 314, and 324 are substantially perpendicular to each of the second axes 312, 316, and 326. However, it is to be understood that any suitable arrangement of axes is contemplated. Moreover, in a preferred embodiment, the LC cell 304 rotates the polarization of light incident upon it by 90°, but it is to be understood that any suitable angle of rotation is contemplated.

Accordingly, in operation in accordance with the preferred embodiment, the LC shutter 204 is polarization-sensitive and switches effectively between a transparent state and a diffusive state with high image integrity, and with high transmission in the transparent state, by way of switching between the presence or absence of applied voltage to the LC cell 304. In the presence of applied voltage to the LC cell 304, any components of ambient light 210 which are polarized along the second axes 312 and 316 of the polarizers 300 and 302 and the second axis 326 of the in-plane anisotropic diffuser 306 of the LC shutter 204 are substantially absorbed. With no rotation of polarization by the LC cell 304, any components of ambient light 210 which are polarized along the first axes 310 and 314 of the polarizers 300 and 302 and the first axis 324 of the in-plane anisotropic diffuser 306 of the LC shutter 204 are substantially transmitted through the LC shutter 204. Furthermore, as discussed above with respect to FIG. 1, light coming from the display 202 and, if the keypad portion 208 is present, light coming from the keypad portion 208, may be transmitted through the LC shutter 204 in the opposite order of transmission as that described above because each of the components of the LC shutter 204 has the same response to light incident from either direction.

If no voltage is applied to the LC cell 304, any components of ambient light 210 which are polarized along the second axis 312 of the first dichroic polarizer 300 are substantially absorbed, but any components of ambient light 210 which are polarized along the first axis 310 of the first dichroic polarizer 300 are substantially transmitted through the first dichroic polarizer 300 as first polarized light 328, and then have their polarization rotated by the LC cell 304, producing post-LC light 330.

The post-LC light 330 is substantially polarized along the second axis 326 of the in-plane anisotropic diffuser 306. Therefore, in accordance with the discussion above regarding the response of the in-plane anisotropic diffuser 306 to light incident along its second axis 326, the in-plane anisotropic diffuser 306 partially scatters and reflects, and partially scatters and transmits, the post-LC light 330. The components of post-LC light 330 that are partially scattered and transmitted by the in-plane anisotropic diffuser 306, because they are polarized along the second axis 316 of the specular reflective polarizer 302, are substantially reflected by the specular reflective polarizer 302. The specular reflection of such components appears diffuse because the incident components are diffuse (as a result of being scattered by the in-plane anisotropic diffuser 306) before they reach the specular reflective polarizer 302.

Accordingly, when no voltage is applied to the LC cell 304, ambient light 210 is not transmitted to the display 202, but is instead diffusively reflected by the LC shutter 204. Similarly, any components of light coming from the display 202 which are polarized along the first axis 314 of the specular reflective polarizer 302 are substantially transmitted therethrough, while any components of light coming from the display 202 which are polarized along the second axis 316 of the specular reflective polarizer 302 are substantially reflected therefrom. Because the components polarized along the first axis 314 of the specular reflective polarizer 302 have their polarization rotated 90° when they reach the LC cell 304, they are then substantially absorbed by the first dichroic polarizer 300, and thus not transmitted through the LC shutter 204.

The LC shutter 204 of the present invention is therefore operative to achieve switching between a transparent state and a diffusive state. Because of the polarization effect of the LC shutter 204 that is introduced by the first dichroic polarizer 300 and the specular reflective polarizer 302, the LC shutter 204 of the present invention is able to achieve this switching with high image integrity and with high transmission in the transparent state.

Figure 5:
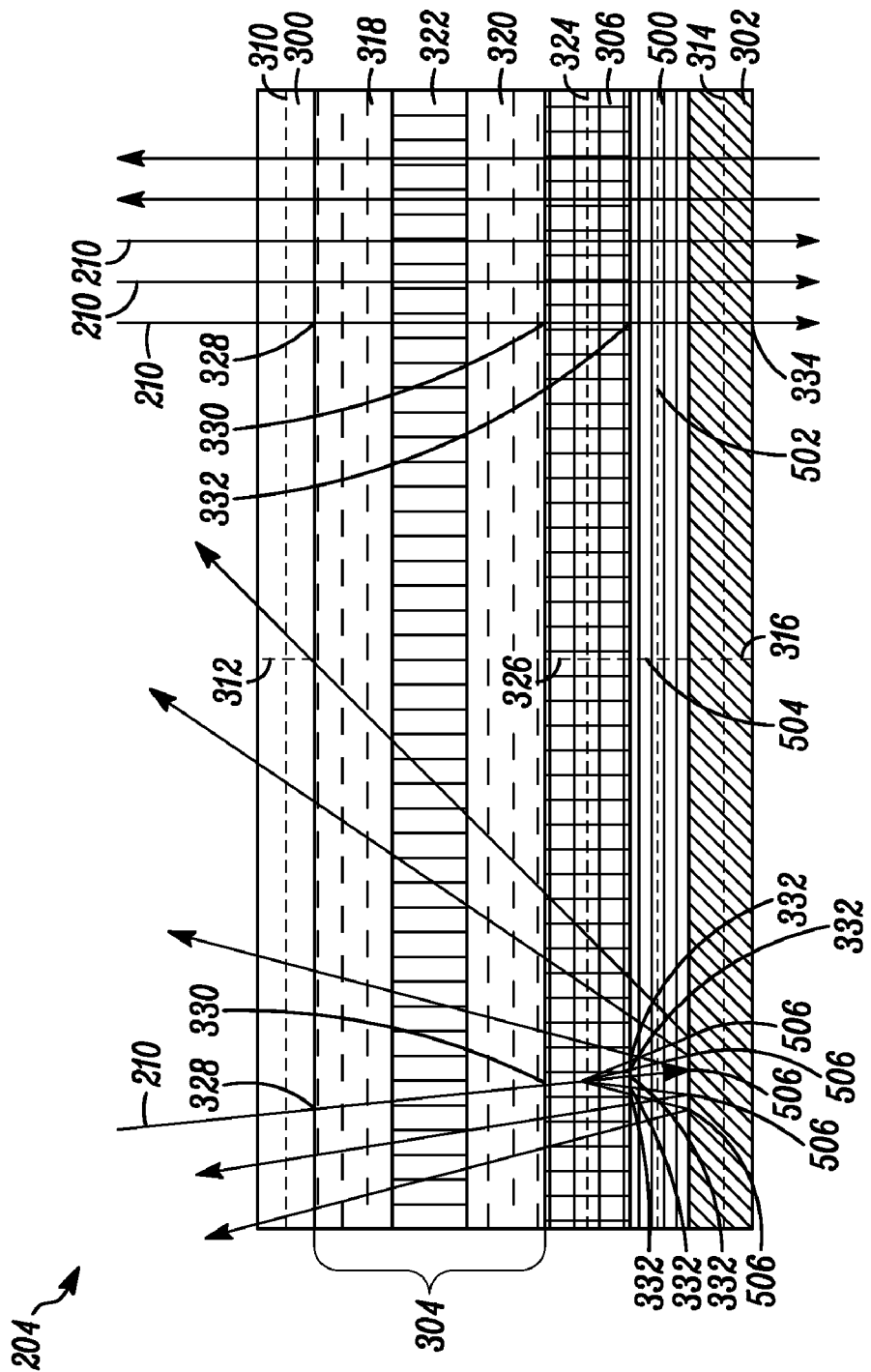
FIG. 5 illustrates the LC shutter of FIG. 3 with an additional narrowband dichroic polarizer in accordance with another embodiment.
Figure 6:
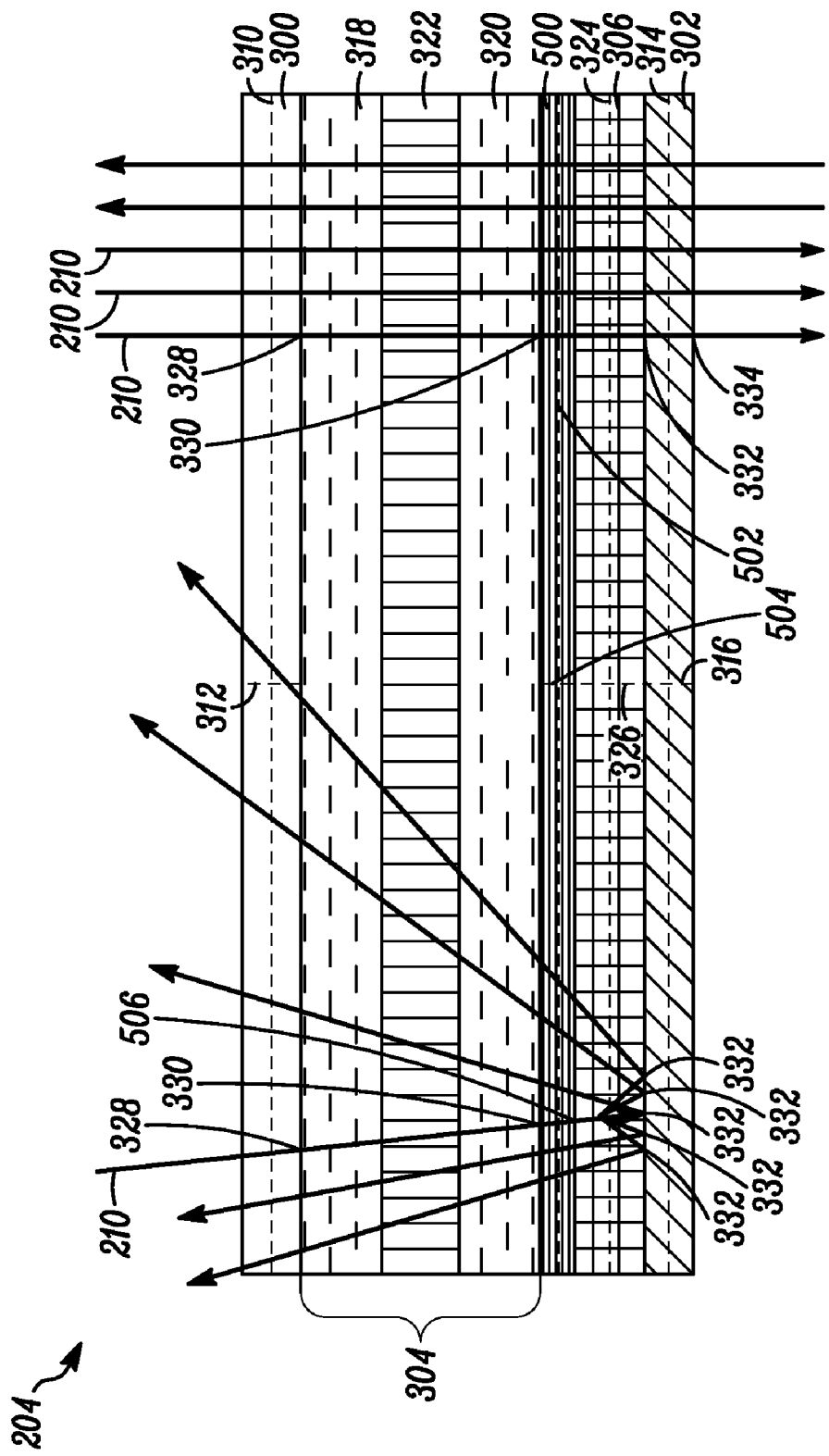
FIG. 6 illustrates the LC shutter of FIG. 3 with an additional narrowband dichroic polarizer having a different placement from that of FIG. 4, in accordance with still another embodiment.
Figure 7:
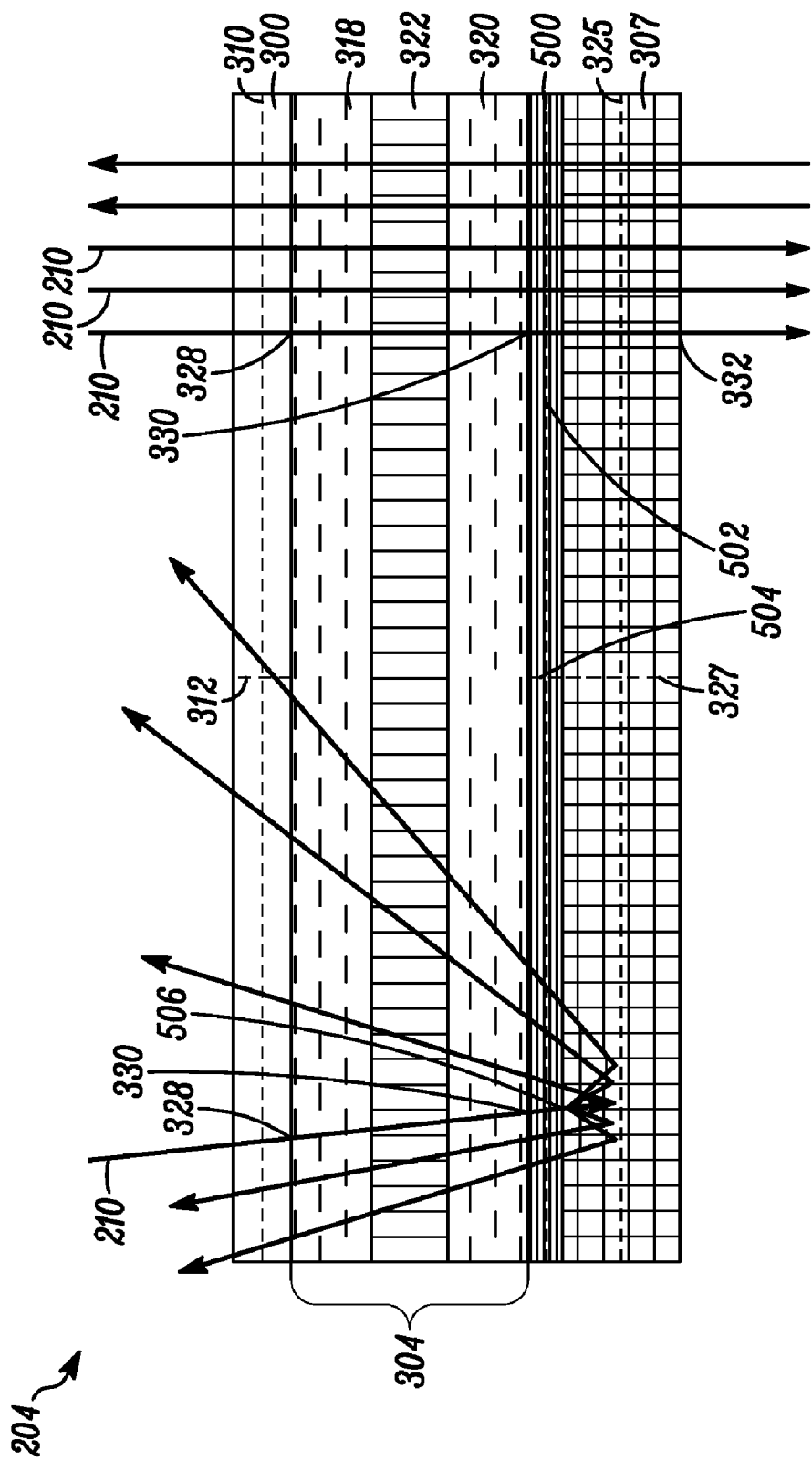
FIG. 7 illustrates the display and a detailed view of the LC shutter of the electronic device of FIG. 2, in accordance with an alternate embodiment.

Further embodiments of the LC shutter 204 are illustrated in FIGS. 5-7. For example, referring to FIG. 5, a second dichroic polarizer 500 may be interposed between the in-plane anisotropic diffuser 306 and the specular reflective polarizer 302. The second dichroic polarizer 500 includes a first (i.e., transmissive) axis 502 and a second (i.e., absorptive) axis 504. In a preferred embodiment, the second dichroic polarizer 500 is a narrowband dichroic polarizer, with its first axis 502 aligned with the first axes 310 and 314 of the polarizers 300 and 302 and the first axis 324 of the in-plane anisotropic diffuser 306. Moreover, in a preferred embodiment, the second axis 504 of the second dichroic polarizer 500 is aligned with the second axis 312 and 316 of the polarizers 300 and 302 and the second axis 326 of the in-plane anisotropic diffuser 306. As known in the art, a narrowband dichroic polarizer polarizes light in a limited range in the visible wavelength of light. Light polarized along the transmissive axis of a narrowband dichroic polarizer is transmitted therethrough with no change in its color. On the other hand, if light is polarized along the absorptive axis of a narrowband dichroic polarizer, its color will be altered because part, but not all, of the visible light spectrum is absorbed. The remainder of the light is transmitted as colored light. The second dichroic polarizer 500 may be, for example, a narrowband dichroic polarizer manufactured by Polatechno Co., Ltd. or any suitable narrowband dichroic polarizer.

Accordingly, the LC shutter 204 operates as described above with respect to FIG. 3, except that if no voltage is applied to the LC cell 304, post-in-plane anisotropic diffuser light 332 is substantially polarized along the second axes 312 and 316 of the polarizers 300 and 302 and the second axis 326 of the in-plane anisotropic diffuser 306 and consequently, in a preferred embodiment, is also polarized along the absorption axis of the second dichroic polarizer 500. Therefore, post-in-plane anisotropic diffuser light 332 is colored by the second dichroic polarizer 500, producing colored light 506 which is then incident upon the specular reflective polarizer 302. Colored light 506, because it is polarized along the second axis 316 of the specular reflective polarizer 302, is then reflected by the specular reflective polarizer 302, producing a diffusive colored state of the LC shutter 204.

Referring now to FIG. 6, yet another embodiment of the present invention includes the second dichroic polarizer 500 interposed between the LC cell 304 and the in-plane anisotropic diffuser 306. If no voltage is applied to the LC cell 304, post-LC light 330 is substantially polarized along the second axes 312 and 316 of the polarizers 300 and 302 and the second axis 326 of the in-plane anisotropic diffuser 306, and consequently, in a preferred embodiment, is also substantially polarized along the second axis 504 of the second dichroic polarizer 500. The post-LC light 330 is then colored by the second dichroic polarizer 500, producing colored light 506 which is then incident upon the in-plane anisotropic diffuser 306. The in-plane anisotropic diffuser 306 then partially scatters and reflects, and partially scatters and transmits, the colored light 506. Post-in-plane anisotropic diffuser light 332, i.e., light that is scattered and transmitted by the in-plane anisotropic diffuser 306 and incident upon the specular reflective polarizer 302, is then substantially reflected by the specular reflective polarizer 302.

As compared to the configuration of FIG. 5, the configuration of FIG. 6 provides a greater degree of coloring when the LC shutter 204 operates in the diffusive state (i.e., with no applied voltage) because all post-LC light 330 that is incident upon the in-plane anisotropic diffuser 306 is colored. In the configuration of FIG. 5, only the components of post-LC light 330 that are partially scattered and transmitted by the in-plane anisotropic diffuser 306 reach the second dichroic polarizer 500. Components of post-LC light 330 that are partially scattered and reflected by the in-plane anisotropic diffuser 306 never reach the second dichroic polarizer 500, are never colored, and consequently are reflected by the in-plane anisotropic diffuser 306 as diffused white light.

Referring back to FIG. 3, the present invention further contemplates an additional embodiment in which the LC shutter 204 provides coloring without the need for the second dichroic polarizer 500. In this embodiment, the specular reflective polarizer 302 is a narrowband specular reflective polarizer. Accordingly, the specular reflective polarizer 302 provides the coloring that is provided by the second dichroic polarizer 500 in, for example, FIG. 5.

As shown in FIG. 3 and as applicable to any of the above embodiments, the LC shutter 204 of the present invention may further include an additional dichroic polarizer 308. The additional dichroic polarizer 308 is a broadband dichroic polarizer, and the LC cell 304, in-plane anisotropic diffuser 306, specular reflective polarizer 302, and, if present, second dichroic polarizer 500, are interposed between the first dichroic polarizer 300 and the additional dichroic polarizer 308. The additional dichroic polarizer 308 has a first axis 336 and a second axis 338, which in a preferred embodiment are aligned, respectively, with the first axes 310 and 314 and the second axes 312 and 316 of the polarizers 300 and 302, and the first axis 324 and the second axis 326 of the in-plane anisotropic diffuser 306 of the LC shutter 204. The additional dichroic polarizer 308 enhances the polarization effect of the LC shutter 204 and is beneficial in view of the non-ideal responses of each of the above components of the LC shutter 204.

Referring now to FIG. 7, the present invention also contemplates an alternate embodiment of the LC shutter 204 from those described with respect to FIGS. 3-6. In this embodiment, the LC shutter 204 includes the first dichroic polarizer 300, the LC cell 304, and a diffusive reflective polarizer 307, but does not include the specular reflective polarizer 302. The LC shutter 204 may further include the second dichroic polarizer 500 and/or the additional dichroic polarizer 308. In a preferred embodiment, the first dichroic polarizer is a broadband dichroic polarizer, the second dichroic polarizer, if present, is a narrowband dichroic polarizer, and the additional dichroic polarizer, if present, is a broadband dichroic polarizer.

In this embodiment, the diffusive reflective polarizer 307 has higher reflectivity than the in-plane anisotropic diffuser 306 used in the embodiments shown and described with respect to FIGS. 3, 5 and 6. The diffusive reflective polarizer may be, for example, the DRPF (Diffuse Reflective Polarizing Film) manufactured by 3M. The DRPF is made from two immiscible polymers. In contrast to the stretched PDLC, the texture is a continuous domain made from a first polymer of a first kind, such as polyethylene naphthalate, and a second polymer of a second kind, such as polymethylmethacrylate. Again, it is preferable that the refractive index mismatch between the first polymer and the second polymer along the second axis 326 be greater than 0.05.

The diffusive reflective polarizer 307 includes a first axis 325 and a second axis 327. Unlike the in-plane anisotropic diffuser 306, the diffusive reflective polarizer 307 is backward scattering to, i.e., causes a diffusive reflection of, essentially all light polarized along the second axis 327, while transmitting essentially all light polarized along the first axis 325. Because of the increased reflectivity of the diffusive reflective polarizer 307, when the LC shutter 204 operates in the diffusive state, the diffusive reflective polarizer 307 scatters and reflects, as opposed to scatters and transmits, a greater amount of light incident upon it, thus allowing the LC shutter 204 to operate without the specular reflective polarizer 302 placed after the diffusive reflective polarizer 307.

Figure 8:
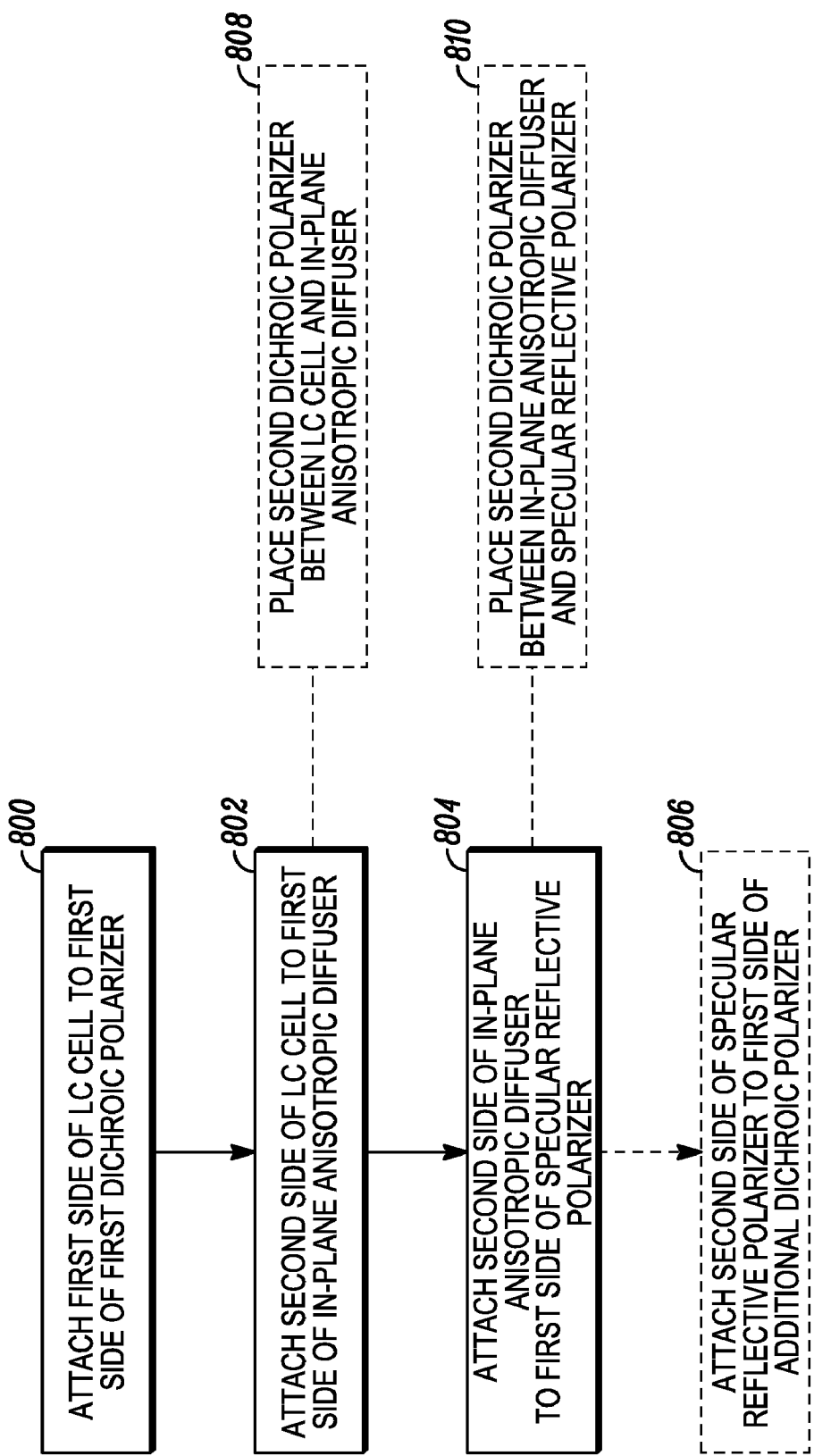
FIG. 8 is a flowchart illustrating one example of a method of making an LC shutter in accordance with one embodiment.

The present invention still further contemplates an LC shutter made according to a method. FIG. 8 is a flowchart illustrating one example of a method of making an LC shutter, such as the LC shutter 204. As shown in block 800, the method includes attaching a first side of an LC cell, such as the LC cell 304, to a first side of a first dichroic polarizer, such as the first dichroic polarizer 300.

As shown in block 802, the method further includes attaching a second side of the LC cell 304 to a first side of an in-plane anisotropic diffuser, such as the in-plane anisotropic diffuser 306 described above with respect to, for example, the embodiments of FIGS. 3, 5 and 6.

As shown in block 804, the method still further includes attaching a second side of the in-plane anisotropic diffuser 306 to a first side of a specular reflective polarizer, such as the specular reflective polarizer 302. The specular reflective polarizer 302 may be a broadband specular reflective polarizer or, in one embodiment, may be a narrowband specular reflective polarizer for coloring light and enabling a diffusive colored state, as discussed above with respect to, for example, FIG. 3.

The method may still further include attaching the second side of the specular reflective polarizer 302 to a first side of an additional dichroic polarizer, such as the additional dichroic polarizer 308, as shown in block 806. The polarization effect of the LC shutter 204 may therefore be increased in view of the non-ideal responses of each of the above components of the LC shutter 204.

In one embodiment, block 802 includes block 808; namely, placing a second dichroic polarizer, such as the second dichroic polarizer 500, between the LC cell 304 and the in-plane anisotropic diffuser 306 for coloring light and enabling a diffusive colored state, as discussed above with respect to, for example, FIG. 6.

In one embodiment, block 804 includes block 810; namely, placing a second dichroic polarizer, such as the second dichroic polarizer 500, between the in-plane anisotropic diffuser 306 and the specular reflective polarizer 302 for coloring light and enabling a diffusive colored state as discussed above with respect to, for example, FIG. 5.

The method may be performed using any suitable manner of attachment including, for example, the use of PSAs (pressure sensitive adhesives), index-matching fluid, or any suitable chemical, mechanical, or other manner of optically coupling two elements together with substantially no air between them. The attachment is generally performed by one or more machines, but as recognized by one having ordinary skill in the art, may also be performed by a human or by a combination of a human and one or more machines.

With reference to the discussion of the embodiments of FIGS. 3, 5 and 6, the LC shutter provides switching between a transparent state and a diffusive state with high image integrity and high transmission in the transparent state. It will be appreciated that the above method need not be performed in the order described. Rather, the present disclosure contemplates any sensible variation of arrangement. By way of example, the method could be performed in reverse order, starting from block 806, if block 806 is included, and otherwise starting from block 804.

Figure 9:
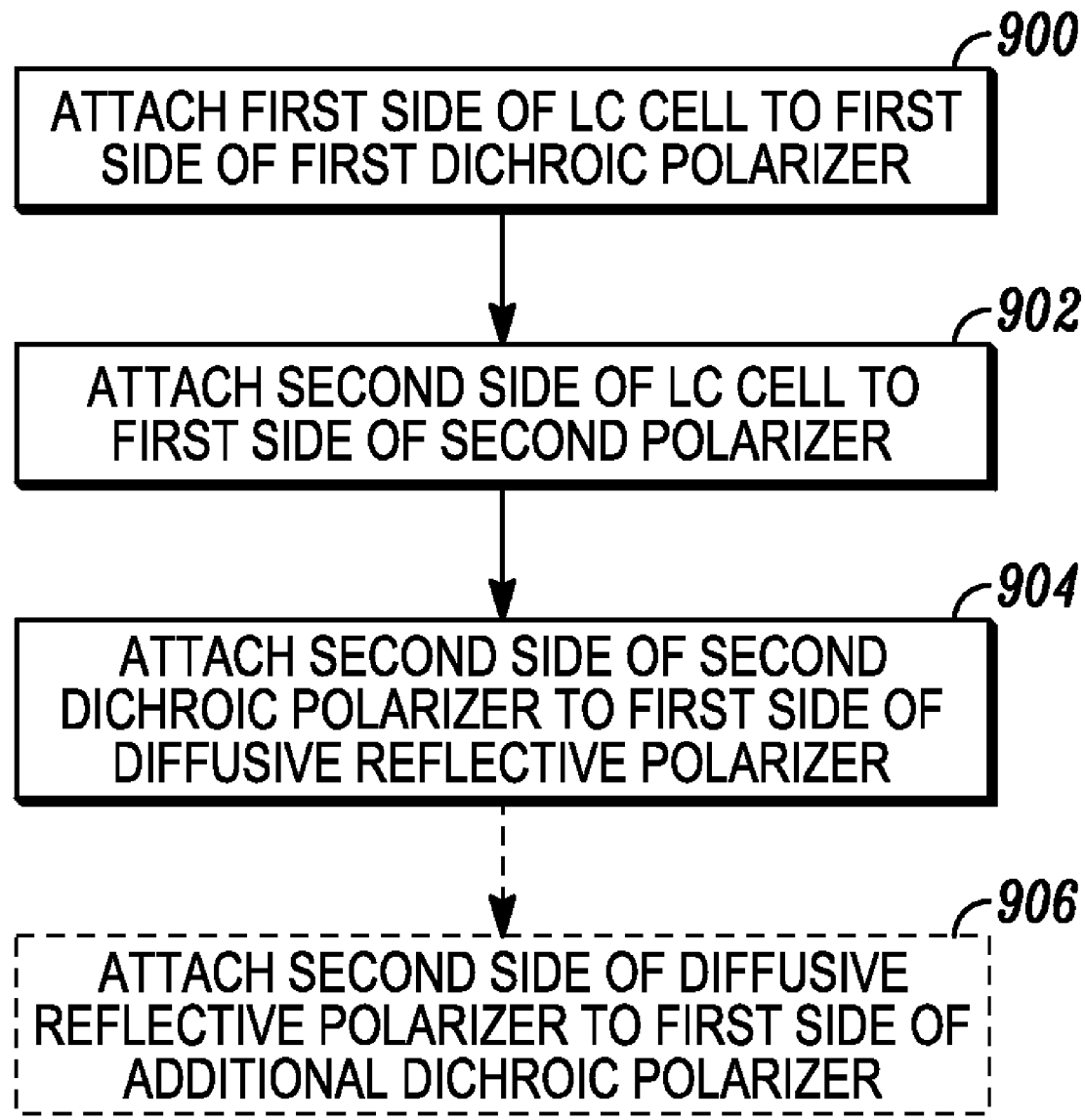
FIG. 9 is a flowchart illustrating one example of a method of making an LC shutter in accordance with an alternate embodiment.

FIG. 9 illustrates another method in accordance with the alternate embodiment of the LC shutter 204 described with respect to FIG. 7. As shown in block 900, the method includes attaching a first side of an LC cell, such as the LC cell 304, to a first side of a first dichroic polarizer, such as the first dichroic polarizer 300.

As shown in block 902, the method includes attaching a second side of the LC cell 304 to a first side of a second dichroic polarizer, such as the second dichroic polarizer 500, for coloring light and enabling a diffusive colored state as described above with respect to, for example, FIG. 7.

As shown in block 904, the method still further includes attaching a second side of the second dichroic polarizer 500 to a first side of a diffusive reflective polarizer, such as the diffusive reflective polarizer 307, as described above with respect to, for example, FIG. 7.

The method may still further include block 906; namely, attaching the second side of the diffusive reflective polarizer 307 to a first side of an additional dichroic polarizer, such as the additional dichroic polarizer 708. The polarization effect of the LC shutter 204 may therefore be increased in view of the non-ideal responses of each of the above components of the LC shutter 204.

The method may be performed using any suitable manner of attachment as described above with respect to FIG. 8. Similarly, the method may be performed in any sensible order, as also described above with respect to FIG. 8.

Among other advantages, an LC shutter and a device including an LC shutter provide appealing visual effects such as switching between a transparent state and a diffusive state to change, for example, the color or visual appearance of, in one example, an exterior surface of a handheld device or other suitable device. As such, the LC shutter can switch between bright diffusive colors or bright diffusive white and a highly transparent state. As such, as applied to a device, the device can appear to be morphing from one color to a transparent state to provide different looks thereby enhancing user appeal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. An LC shutter comprising:
a first dichroic polarizer;
a diffusive reflective polarizer;
an LC cell interposed between the first dichroic polarizer and the diffusive reflective polarizer;
a second dichroic polarizer interposed between the LC cell and the diffusive reflective polarizer; and
wherein the first dichroic polarizer is a broadband dichroic polarizer and the second dichroic polarizer is a passive narrowband dichroic polarizer, the LC cell operative to cause the LC shutter to operate in a visible diffusive state or a transparent state in response to application of a voltage.

2. The LC shutter of claim 1, further comprising a third dichroic polarizer that is a broadband dichroic polarizer, and wherein the diffusive reflective polarizer, the second dichroic polarizer, and the LC cell are interposed between the first dichroic polarizer and the third dichroic polarizer.

3. The LC shutter of claim 1, wherein the diffusive reflective polarizer comprises:
a polymer of a first kind; and
a polymer of a second kind which is immiscible with the polymer of a first kind;
wherein the diffusive reflective polarizer is such that there is a refractive index match between the polymer of a first kind and the polymer of a second kind along a first axis of the diffusive reflective polarizer and a refractive index mismatch between the polymer of a first kind and the polymer of a second kind along a second axis of the diffusive reflective polarizer.

4. The LC shutter of claim 3, wherein the diffusive reflective polarizer is transparent to incoming light polarized along the first axis and backward scattering to incoming light polarized along the second axis.

5. The LC shutter of claim 1, wherein the LC cell comprises:
a first substrate;
a second substrate; and
liquid crystal material interposed between the first substrate and the second substrate.

6. The LC shutter of claim 5, wherein the LC cell is operative to rotate polarization of incident light when a voltage is not applied to the LC cell.

7. An electronic device comprising:
a display operative to emit light; and
at least a portion of an LC shutter positioned over the display, and wherein the LC shutter further comprises:
a first dichroic polarizer;
a diffusive reflective polarizer;
an LC cell interposed between the first dichroic polarizer and the diffusive reflective polarizer;
a second dichroic polarizer interposed between the LC cell and the diffusive reflective polarizer; and
wherein the first dichroic polarizer is a broadband dichroic polarizer and the second dichroic polarizer is a passive narrowband dichroic polarizer.

8. The electronic device of claim 7, wherein the first dichroic polarizer is a broadband dichroic polarizer, and wherein the LC shutter further comprises a second dichroic polarizer that is a broadband dichroic polarizer, and wherein the diffusive reflective polarizer and the LC cell are interposed between the first dichroic polarizer and the second dichroic polarizer.

9. The electronic device of claim 7, wherein the LC shutter further comprises a third dichroic polarizer that is a broadband dichroic polarizer, and wherein the diffusive reflective polarizer, the second dichroic polarizer, and the LC cell are interposed between the first dichroic polarizer and the third dichroic polarizer.

10. The electronic device of claim 7, wherein at least a portion of the LC shutter is further operatively positioned over a keypad operative to emit light.

11. The electronic device of claim 7, further comprising a radio-telephone subsystem operatively coupled to the display.

12. The electronic device of claim 7, wherein the diffusive reflective polarizer comprises:
   a polymer of a first kind; and
   a polymer of a second kind which is immiscible with the polymer of a first kind;
   wherein the diffusive reflective polarizer is such that there is a refractive index match between the polymer of a first kind and the polymer of a second kind along a first axis of the diffusive reflective polarizer and a refractive index mismatch between the polymer of a first kind and the polymer of a second kind along a second axis of the diffusive reflective polarizer.

13. The electronic device of claim 12, wherein the diffusive reflective polarizer is transparent to incoming light polarized along the first axis and backward scattering to incoming light polarized along the second axis.

14. The electronic device of claim 7, wherein the LC cell comprises:
   a first substrate;
   a second substrate; and
   liquid crystal material interposed between the first substrate and the second substrate.

15. The electronic device of claim 14, wherein the LC cell is operative to rotate polarization of incident light when a voltage is not applied to the LC cell.

* * * * *